Jan. 16, 1962 E. W. MARKOW 3,017,583

LARGE ANGLE RF PHASE SHIFTERS

Filed June 6, 1958 2 Sheets-Sheet 1

INVENTOR.
ELLIOTT W. MARKOW
BY N. Vincent Harsha
ATTORNEYS

Jan. 16, 1962

E. W. MARKOW 3,017,583

LARGE ANGLE RF PHASE SHIFTERS

Filed June 6, 1958

2 Sheets-Sheet 2

INVENTOR.
ELLIOTT W. MARKOW
BY H. Vincent Harsha
ATTORNEYS

United States Patent Office 3,017,583
Patented Jan. 16, 1962

3,017,583

LARGE ANGLE RF PHASE SHIFTERS

Elliott W. Markow, Burlington, Mass., assignor to Raytheon Company, a corporation of Delaware Filed June 6, 1958, Ser. No. 740,359
4 Claims. (Cl. 332—22)

The present invention relates to phase control circuits having particular utility at radio frequencies.

In many instances it is desirable to introduce a controlled amount of phase shift in radio frequency circuits. For example, in a mechanically fixed antenna system the directivity of the radiated energy pattern may be controlled by varying the phase of the radio frequency energy fed to the antenna. In test equipment for measuring the frequency and phase characteristics of amplifiers or filter networks a controlled phase shift device is required. Another obvious application of a device of this type is in the field of phase-modulated radio frequency transmitters.

Accordingly, it is an object of the present invention to provide a novel method for obtaining controlled amounts of phase shift at radio frequencies.

A further object of the invention is to provide a system for producing such phase shifts as a function of a D.C. control voltage.

A more specific object of the present invention is to provide a phase shifting device to introduce a predetermined phase shift of up to ±180° or more at variable radio frequencies.

A particular object of this invention is to produce an electrical circuit arrangement which provides a very sensitive phase control of radio frequency energy in response to input D.C. signals.

Figure 1:
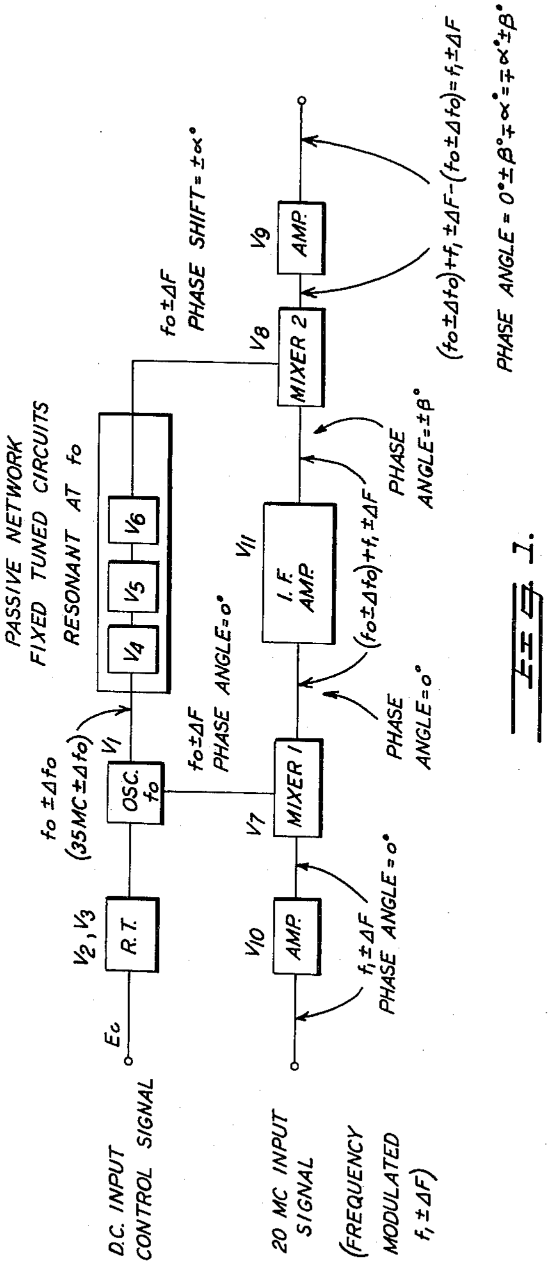
Figure 3:
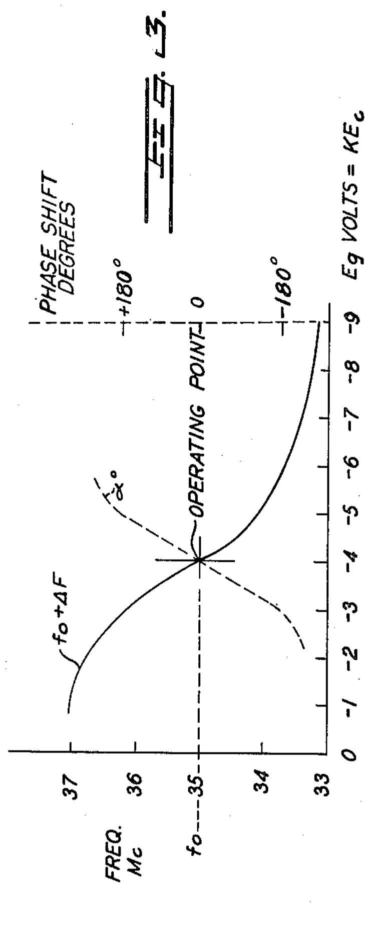
Figure 2:
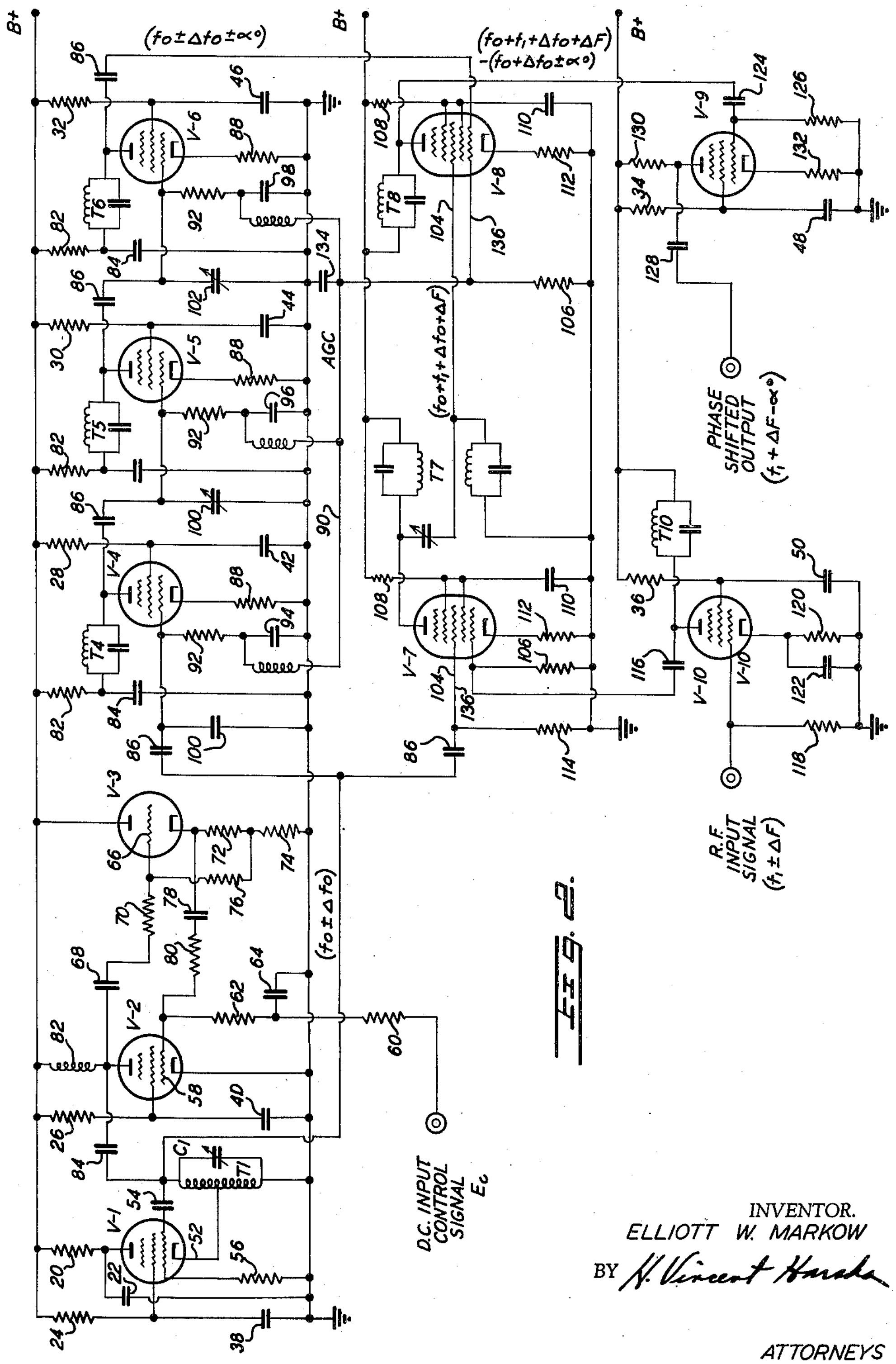

Further applications of the device of the present invention as well as additional objects and advantages thereof will become apparent in the detailed description which follows, taken together with the accompanying drawings in which, FIGURE 1 represents, in block diagram, the overall arrangement of circuit elements which comprise the novel phase shift device;

FIGURE 2 is a schematic diagram of a preferred embodiment of the invention shown in FIGURE 1; and FIGURE 3 is a graph used in explaining the operation of certain portions of FIGURE 2.

Referring now to FIGURES 1 and 2, a variable radio frequency oscillator indicated at V–1 produces radio frequency energy at the frequency $f_0$. A reactance tube modulator circuit including vacuum tubes V–2, V–3 is coupled to the oscillator in such a manner as to vary the frequency $f_0$ by an amount $\pm\Delta f_0$. A. D.C. input control signal $E_c$ determines the effective reactance of the modulator. A number of fixed tuned high Q circuits including vacuum tubes V–4, V–5, V–6 provide a passive network which is resonant at the frequency $f_0$. Since the phase shift across a single tuned circuit of high Q can be quite large for small shifts of frequency about the resonance point, the frequency shifted oscillator output $f_0\pm\Delta f_0$ may be fed into the passive network and at the output thereof will have undergone a phase change or shift of $\pm\alpha°$.

A second oscillator output at the frequency $f_0\pm\Delta f_0$ is coupled into a first mixer stage which includes tube V–7. The radio frequency signal whose phase is to be controlled provides the other input to the first mixer. This signal has an indicated frequency of $f_1$, and in the preferred embodiment shown may optionally be frequency modulated as designated by the notation $f_1\pm\Delta F$. An amplifier stage of zero phase shift may be included for the radio frequency signal if desired. Such an amplifier stage is shown comprising vacuum tube V–10 and its associated circuit elements.

The output of the first mixer is selected as the sum frequencies $(f_0\pm\Delta f_0+f_1\pm\Delta F)$ and this is fed as one input to a second mixer stage which includes vacuum tube V–8. The other input to this second mixer is the output signal from the passive network, namely $$(f_0\pm\Delta f_0\pm\alpha°)$$

wherein the latter term designates the phase shift occurring in the fixed tuned circuits. The output of the second mixer stage is selected to be the difference frequencies according to the following notation:

$$(f_0\pm\Delta f_0+f_1\pm\Delta F)-(f_0\pm\Delta f_0\pm\alpha°)=f_1\pm\Delta F\mp\alpha°$$

It will be noted that an intermediate frequency amplifier to include a vacuum tube stage V–11 has been indicated in FIGURE 1. Such an amplifier may prove desirable in the event that the gain of the first mixer is low. It should have a negligible phase shift, $\pm\beta°$, of the order of a few degrees. This optional amplifier stage has not been included in the detailed schematic diagram of FIGURE 2 in the interests of clarity, but it may take the form of an amplifier stage similar to that of tube V–10.

Turning to the details of FIGURE 2, the anode of oscillator tube V–1 is connected to a common source of energizing potential B+ by way of resistor 20. The tube anode is by-passed to ground by condenser 22. In the preferred embodiment tube V–1 is shown as an RF pentode having the conventional screen and suppressor grids, as are shown in tubes V–2, V–4, V–5, V–6, V–9 and V–10. In accordance with conventional and well-known practice the screen grids of these respective tubes are energized from the B+ source by the respective resistors 24, 26, 28, 30, 32, 34 and 36; and by-passed by the condensers 38, 40, 42, 44, 46, 48 and 50. The suppressor grid connections, also conventional, have not been shown.

The frequency of the oscillator tube V–1 circuit is determined by the tapped L–C tank T–1 tuned to the resonant frequency $f_0$ by means of the frequency varying condenser $C_1$. The inductance tap is connected to cathode 52, and a feed-back condenser 54 and grid return resistor 56 are provided in a known manner.

The basic frequency $f_0$ of the oscillator tuned circuit T–1 is subject to frequency variation by means of the reactance tube circuit of the tubes V–2, V–3 which effectively provides a variable shunt reactance across the condenser $C_1$. The main reactance tube V–2 is controlled by a D.C. input control signal $E_c$ which is coupled to the control grid 58 by way of the isolating resistor 60 and the grid resistor 62. An RF by-pass condenser 64 is connected from the junction of resistors 60 and 62 to ground.

A high impedance cathode follower stage including the triode tube V–3 is included in the reactance tube circuit in order to reduce the shunting effect across the tuned circuit $T_1$. To this end the control grid 66 of triode V–3 is coupled to the anode of V–2 by means of a condenser 68 and a limiting resistor 70. Grid 66 is returned to the junction point of the cathode load resistors 72, 74 by resistor 76. A condenser 78 couples the cathode follower output back to the control grid 58 of the main reactance tube V–2 through resistor 80 in the proper phase so that the tube impedance, together with the fixed inductance 82 and the coupling condenser 84, acts as an over-all variable reactance to produce the frequency shift $\pm\Delta f_0$ of the oscillator stage.

The particular arrangement of reactance tube modulator circuit used is not critical to the broad idea of this invention. Any suitable circuitry which will shift the basic oscillator frequency $f_0$ by a controlled amount $\Delta f_0$ according to the sense and magnitude of the D.C. control signal $E_c$ is all that is required. The circuit of tubes V–2, V–3 as shown in FIGURE 2 is considered to be analogous to many known variable reactance arrangements. The curve of FIGURE 3 illustrates the frequency shift or swing about the operating point $f_0$ due to variations in the applied control signal $E_c$. Resultant phase shift is also shown in FIGURE 3.

The passive cascaded resonant network employing V–4, V–5, V–6, as buffering devices as shown in FIGURE 1, provides maximum practical phase shifts per circuit of approximately ±65°, determined as a function of $\Delta f_0$ and design of the networks. The number of and configuration of the phase shift network may be varied as desired.

Each tuned circuit amplifier stage includes a vacuum tube amplifier V–4, V–5, or V–6 which is provided with a tuned anode circuit T–4, T–5, or T–6, respectively, which circuit is resonant at the frequency $f_0$. Anode potentials are applied over resistors 82 with the usual by-pass condensers 84. A first coupling condenser 86 serves to feed the frequency-shifted oscillator signal into the passive network, and similar coupling condensers 86 interconnect the cascaded stages and provide an output coupling to the second mixer tube V–8. Each amplifier stage is self-biased by the current flow through its cathode resistor 88, and this bias is augmented by an AGC voltage which is taken from the bus 90. This AGC voltage is developed due to the detector action at the first tube grid 136 of the second mixer and appears across the AGC load resistor 106 and condenser 134 in combination. AGC action in the tuned circuit section is necessary because of the large gain variations encountered while detuning from center frequency to obtain large amounts of phase shift.

The above-described AGC voltage is applied to the grid return resistors 92 of each amplifier stage through a choke-feed arrangement as shown. The tuning of each stage is basically determined by the anode tuned circuits T–4, T–5 and T–6, the resonant frequency of which is determined by the respective inductances and shunt capacitances associated with each inductance. Therefore the operating frequency must be considered in order to keep the Q's reasonably high when selecting these input grid condenser values for each tuned amplifier stage.

The first and second mixers according to this invention include the multi-grid vacuum tube circuits of tubes V–7 and V–8, respectively. The circuitry of these tubes is somewhat similar, and similar reference numerals will be applied to designate similar elements. One input to the mixer stage is by way of the third tube grid 104 which is shielded by the second and fourth grids which latter grids are maintained at a predetermined potential by a connection including the resistor 108 and by-pass condenser 110.

The other mixer input is coupled into the first vacuum tube grid 136, and the mixer output in each case is selected by means of a tuned circuit in the anode of the respective tubes V–7 and V–8. The cathode of each mixer tube is self-biased by the resistor 112.

In particular the first mixer at tube V–7 receives one input of frequency $f_0 \pm \Delta f_0$ through the coupling condenser 86 which connects the oscillator output of V–1 to the grid 104. A grid return resistor 114 is connected between grid 104 and ground. The other signal input to the first mixer is the RF input signal $f_1 \pm \Delta F$ which is fed through a coupling condenser 116 to the grid 136. This grid is returned to ground by the resistor 106.

Output of the first mixer is the sum of the two inputs as selected by the double tuned circuit $T_7$, which circuit also serves to provide one of the input signals to grid 104 of the second mixer stage at tube V–8. The other input to tube V–8 is the output of the passive network which is fed to the first tube grid 136 as indicated.

The output of the second mixer is selected to be the difference frequency between the two input signals. This selection is accomplished by the tuned anode circuit T–8 which is resonant at the difference frequency. This output is represented by the notation $f_1 + \Delta F - \alpha°$, with the last term indicating the resultant controlled phase shift occcurring across the passive network V–4, V–5, V–6 due to the predetermined value of D.C. input control signal $E_c$. The selected output may be amplified to a useful level in the amplifier stage of tube V–9, and to that end the signal is coupled to the input grid by condenser 124 and the output signal developed at anode resistor 130 is taken off through condenser 128. An amplifier grid return resistor 126 and cathode bias resistor 132 are provided in a conventional manner.

Amplification of the RF input signal to be phase shifted is obtained at the tube V–10. This signal is applied to the input grid across the grid resistor 118 and is taken off at the tuned anode circuit T–10. Grid bias is developed by the RC combination 120, 122.

The invention is not limited to the particular circuit shown in the embodiment of FIGURE 2, however for one such arrangement used in practice for which the frequency $f_0$ was 35.0 mc. and $f_1$ was a 20 mc. frequency-modulated input signal, and wherein controlled amounts of phase shift of ±180° were obtainable, the following circuit elements were used:

| | |
|---|---|
| V–1, V–2 | 6AK5 pentode. |
| V–4, V–5, V–6, V–9 and V–10 | 6BD6 pentode. |
| V–7 and V–8 | 6BE6 mixer. |
| V–3 | 6C4 triode. |

Tuned circuit resonance characteristics:

| | |
|---|---|
| T–1 | $f_0$=35.0 mc. |
| T–4, T–5, T–6 | $f_0$=35.0 mc.; Q=100; L=1 μh.; C=15 mfd. |
| T–8, T–10 | $f_1$=20 mc.; Q=20; Z=8K; L=3 μh.; C=15 mfd. |
| T–7 | $f_0+f_1$=35+20=55 mc.; $Q_1=Q_2$=40; $Q_{12}$=2; $L_1=L_2$=.6 μh.; $C_1=C_2$=10 mfd.; $C_{12}$=½–3 mfd. |

Resistance values; K=1000, $M=(10)^6$:

| | |
|---|---|
| Resistors **20, 82** | 1.2K |
| Resistors **24, 56, 106** | 22K |
| Resistors **26, 34, 36** | 27K |
| Resistors **28, 30, 32** | 33K |
| Resistor **60** | 2.2K |
| Resistor **62** | 1M |
| Resistor **70** | 200 |
| Resistor **80** | 220 |
| Resistor **88** | 100 |
| Resistor **92** | 0.5M |
| Resistor **72** | 150 |
| Resistor **74** | 560 |
| Resistors **76, 114, 126** | 100K |
| Resistor **108** | 6.8K |
| Resistor **112** | 68 |
| Resistor **118** | 51 |
| Resistors **120, 132** | 680 |
| Resistor **130** | 470 |

Capacitance values:

| | | |
|---|---|---|
| Condensers **22, 38, 40, 42, 44, 46, 48, 84, 110** | mfd | .005 |
| Condensers **50, 122** | mfd | .01 |
| Condensers **54, 124** | mmf | 50 |
| Condensers **68, 78, 84, 96, 98, 128** | mmf | 200 |
| Condenser **86** | mmf | 2 |
| Condenser **94** | mfd | .001 |
| Condenser **100** | mmf | 15 |
| Condenser **102** | mmf | 7–30 |
| Condenser **116** | mmf | 5 |
| Inductance **82** | mh | 1 |
| B+ | volts | 150 |

I claim:

1. In combination, means for generating a first frequency modulated signal; means for generating a second frequency modulated signal; means connected to said first and second generating means for combining said first and second frequency modulated signals to produce a signal having a frequency equal to the sum of the frequencies of said first and second modulated signals; a phase shift network including at least one resonant circuit tuned to the center frequency of said first frequency modulated signal and connected to said first generating means for shifting the phase of said first frequency modulated signal; means connected to said first generating means for controlling the frequency variation of said first frequency modulated signal to provide a preselected phase shift in response to said frequency variation; and means connected to said phase shift network and to said first combining means for combining the output signals from said first phase shift network and said first combining means to produce a frequency modulated output signal having a frequency equal to the frequency of said second frequency modulated signal and having a phase shift substantially equal to said preselected phase shift.

2. In combination, means for generating a first frequency modulated signal; means for generating a second frequency modulated signal; means connected to said first and second generating means for combining said first and second frequency modulated signals to produce a signal having a frequency equal to the sum of the frequencies of said first and second frequency modulated signals; a phase shift network including a plurality of resonant circuits tuned to the center frequency of said first frequency modulated signal and connected to said first generating means for shifting the phase of said first frequency modulated signal; means connected to said first generating means for controlling the frequency variation of said first frequency modulated signal to provide a preselected phase shift in response to said frequency variation; and means connected to said phase shift network and to said first combining means for combining the output signals from said first phase shift network and said first combining means to produce a frequency modulated output signal having a frequency equal to the frequency of said second frequency modulated signal and having a phase shift substantially equal to said preselected phase shift.

3. In combination, means for generating a first frequency modulated signal; means for generating a second frequency modulated signal; means connected to said first and second generating means for combining said first and second frequency modulated signals to produce a signal having a frequency equal to the sum of the frequencies of said first and second frequency modulated signals; a phase shift network including a plurality of resonant circuits tuned to the center frequency of said first frequency modulated signal and connected to said first generating means for shifting the phase of said first frequency modulated signal; reactance tube means connected to said first generating means; means for applying a D.C. control signal to said reactance tube means for controlling the frequency variation of said first frequency modulated signal to provide a preselected phase shift in response to said frequency variation; and means connected to said phase shift network and to said first combining means for combining the output signals from said phase shift network and said first combining means to produce a frequency modulated output signal having a frequency equal to the frequency of said second frequency modulated signal and having a phase shift substantially equal to said preselected phase shift.

4. In combination, means for generating a first frequency modulated signal; means for generating a second frequency modulated signal; means connected to said first and second generating means for combining said first and second frequency modulated signals to produce a signal having a frequency equal to the sum of the frequencies of said first and second frequency modulated signals; a phase shift network including a plurality of resonant circuits tuned to the center frequency of said first frequency modulated signal and connected to said first generating means for shifting the phase of said first frequency modulated signal; reactance tube means connected to said first generating means; means for applying a D.C. control signal to said reactance tube means for controlling the frequency variation of said first frequency modulated signal to provide a preselected phase shift in response to said frequency variation; amplifying means connected to first combining means; and means connected to said phase shift network and to said amplifying means for combining the output signals of said phase shift network and said amplifying means to produce a frequency modulated output signal having a frequency equal to the frequency of said second frequency modulated signal and having a phase shift substantially equal to said preselected phase shift.

References Cited in the file of this patent

UNITED STATES PATENTS

| | | |
|---|---|---|
| 2,358,152 | Earp | Sept. 12, 1944 |
| 2,473,318 | Weighton | June 14, 1949 |
| 2,498,242 | Boykin | Feb. 21, 1950 |
| 2,852,606 | Curry | Sept. 16, 1958 |